No. 865,968. PATENTED SEPT. 10, 1907.
J. HICKSON.
MOLD FOR MAKING CULVERTS, CONDUITS, AND SIMILAR HOLLOW STRUCTURES.
APPLICATION FILED APR. 30, 1907.

WITNESSES:

Joseph Hickson, INVENTOR.

By C. A. Snow & Co.
ATTORNEYS

UNITED STATES PATENT OFFICE.

JOSEPH HICKSON, OF MOUNT GILEAD, OHIO, ASSIGNOR OF TWO-FIFTHS TO THAD E. BUCK, OF MOUNT GILEAD, OHIO.

MOLD FOR MAKING CULVERTS, CONDUITS, AND SIMILAR HOLLOW STRUCTURES.

No. 865,968.      Specification of Letters Patent.      Patented Sept. 10, 1907.

Application filed April 30, 1907. Serial No. 371,103.

*To all whom it may concern:*

Be it known that I, JOSEPH HICKSON, a citizen of the United States, residing at Mount Gilead, in the county of Morrow and State of Ohio, have invented a new and useful Mold for Making Culverts, Conduits, and Similar Hollow Structures, of which the following is a specification.

This invention relates to molds for making culverts, sewers, drains, conduits and similar hollow structures from concrete and other material and has for its object to provide a strong, durable and thoroughly efficient mold capable of being quickly set up for use and by means of which the culvert may be built in one continuous length at the place required for its permanent location.

A further object of the invention is to provide a mold which will permit the formation of the culvert or sewer and also allow the back filling to be carried on during the construction of the work.

A further object is to provide a mold including an inner tube or shell and an outer segmental shell or former, said former being spaced from and movable on the exterior face of the inner shell thereby to impart the desired shape to the culvert.

A further object is to provide means for adjusting the outer member or former to permit the formation of culverts of different thicknesses, and means for raising and lowering said member.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

Figure 1:
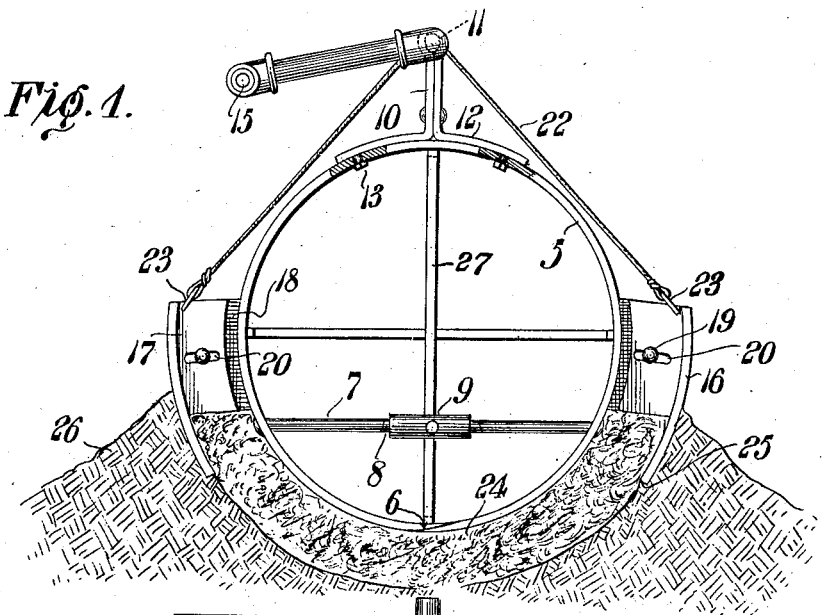
Figure 2:
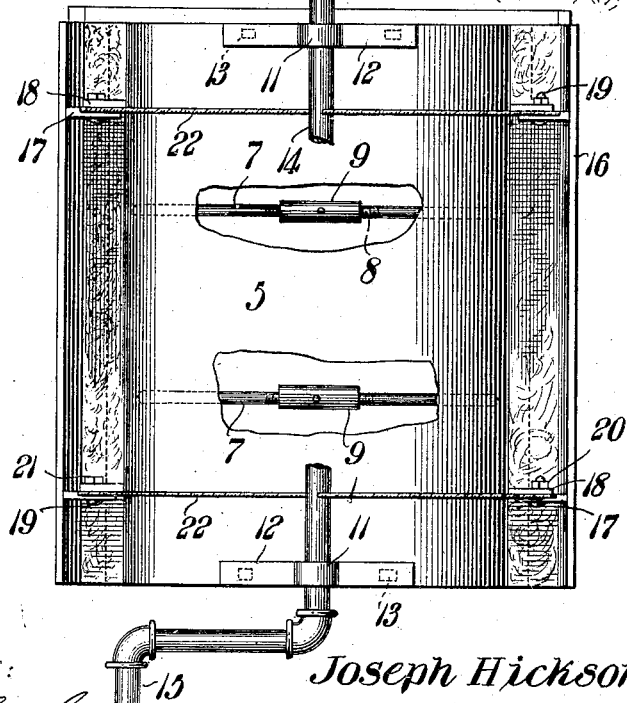

In the accompanying drawings forming a part of this specification: Figure 1 is an end elevation partly in section of a mold constructed in accordance with my invention. Fig. 2 is a top plan view of the same.

Similar numerals of reference indicate corresponding parts in all of the figures of the drawings.

The improved mold forming the subject matter of the present invention is principally designed for building culverts, drains, sewers and similar hollow structures in one continuous length at the place required for permanent location so as to obviate the necessity of making separate or detachable sections and subsequently uniting the same.

The mold consists of an inner expansible shell or tube 5 having its adjacent ends over-lapped and inclined or beveled at 6 so as to permit the shell to be expanded and contracted when it is desired to make culverts of different cross sectional diameters.

Extending transversely across the inner member or shell 5 and secured in any suitable manner to the exterior walls thereof are rods 7 the inner ends of which are threaded at 8 for engagement with suitable connecting collars 9 the latter constituting turn buckles so that the rod 7 may be adjusted thereby to expand and contract the inner shell.

Secured to the exterior walls of the shell or member 5 at the opposite ends thereof are vertically disposed brackets 10 each preferably formed of a single piece of metal bent upon itself to form a terminal eye 11 and having its opposite ends bent downwardly in parallel relation and thence extended laterally to form attaching arms 12 which latter are detachably secured to the adjacent walls of the shells in any suitable manner as by bolts or similar fastening devices 13.

Journaled in the eyes or bearings 11 is a horizontally disposed shaft 14 preferably extending the entire length of the shell or member 5 and having one end thereof extending laterally to form a terminal crank or handle 15 by means of which the shaft may be rotated for the purpose hereinafter referred to.

Mounted for sliding movement on the exterior walls of the hollow member 5 are movable mold sections or formers each consisting of a segmental plate 16 preferably curved to conform to the curvature of the exterior wall of the shell 5 and spaced from the latter by overlapping plates 17 and 18 to form an intermediate molding compartment 19. The plate 18 is curved to conform to and bears against the adjacent wall of the member 5 and is provided with a laterally extending pin 19 which projects through an elongated slot 20 formed in the adjacent plate 17 so that the plates may be adjusted laterally to vary the thickness of the walls of the culvert, said plates being locked in adjusted position by suitable clamping nuts 21.

Secured to the operating shaft 14 are cables, ropes or other flexible elements 22 having their lower ends connected to rings or loops 23 secured to the slotted plates 17 so that by rotating the crank handle 15 the segmental mold sections or formers may be caused to travel over the surface of the inner member or shell 5 during the formation of the culvert or sewer.

In constructing the culvert or sewer a quantity of cement, concrete or other material is first placed in the ditch or gully in which the culvert is to be formed and the upper surface thereof troweled off to form a concave bed 24 for the reception of the relatively stationary inner mold section or shell 5, after which the movable mold sections or formers are lowered by operating the shaft 15 until the lower longitudinal edges 25 of the plates 16 engage the cement foundation at the base of the inner section. The cement, concrete or other plastic material is then shoveled into the compartment 19 and thoroughly tamped, a filling 26 being previously packed against the exterior walls of the plate 16, as best shown in Fig. 1 of the drawing. After the cement in the molding compartments has been thoroughly tamped the crank 15 is rotated so as to elevate the mold sections or formers a short distance which causes the earth or filling 26 to bear against the finished surface of the culvert or conduit. When the mold sections or formers have been raised more earth is packed against the plates 16 and additional cement introduced into the molding compartments 19 so that when the mold sections are again elevated the filling or earth will follow the contour of the finished culvert or conduit. When the culvert is nearly completed, that is to say when the mold sections or formers reach the arms 12, the latter are removed by detaching the bolts 13 and the cement or concrete forming the upper surface of the conduit troweled off smooth with the adjacent exterior walls of the conduit so as to form a continuous homogeneous culvert section.

By adjusting the turn buckles 9 the walls of the inner member or shell 5 may be expanded or contracted to permit the formation of culverts of different widths while by regulating the distance between the plates 16 and the exterior walls of the inner member 5 the thickness of the walls of the culvert may be varied at will.

Attention is here called to the fact that the lower longitudinal edges of the plates 16 are extended below the transverse connecting plate 17 to form a depending guide lip adapted to bear against the exterior surface of the finished portion of the culvert so as to assist in preventing tipping or tilting movement of the segmental mold sections or formers during the molding operation.

One or more removable supports or braces 27 are preferably placed within the tubular member 5 in order to reinforce said member and assist in sustaining the weight of the cement or other plastic material.

From the foregoing description it will be seen that there is provided a strong, durable and thoroughly efficient mold which will permit the formation of culverts of different lengths and cross sectional diameters and at the same time permit the back filling to be carried on during the construction of the culvert.

Having thus described the invention what is claimed is:

1. A mold including an inner member, a former spaced from and movable on the face of the inner member, and means for varying the distance between said former and inner member.

2. A mold including an inner member, a former spaced from and movable on the face of the inner member, and means for raising and lowering the former.

3. A mold including an expansible inner member, a segmental outer member spaced from and movable on the face of the inner member, and means for raising and lowering the outer member.

4. A mold including an expansible relatively stationary inner member, a movable outer member spaced from and curved to conform to the exterior walls of the inner member, means for raising and lowering the movable member, and adjustable spacing plates carried by the movable member and engaging the exterior walls of the inner member.

5. A mold including an expansible inner member, an outer member spaced from and movable on the exterior walls of the inner member, means for expanding and contracting the inner member, and means for raising and lowering the outer member.

6. A mold including an expansible shell, a segmental shell spaced from and movable over the exterior walls of the expansible shell, means for varying the distance between the expansible and segmental shells, and means for raising and lowering said segmental shell.

7. A mold including a shell, brackets secured to the exterior walls of the shell, a shaft journaled in said brackets, segmental mold sections spaced from and mounted for movement on the exterior walls of the shell, and a flexible connection between the segmental mold sections and the shaft for raising and lowering the said mold sections.

8. A mold including a shell, longitudinal plates curved to conform to and spaced from the exterior walls of the shell, transverse plates spacing the longitudinal plates from the shell and bearing against the exterior walls of the latter, an operating shaft journaled on the shell, and a flexible connection between the operating shaft and the longitudinal plates for raising and lowering the latter.

9. A mold including an expansible shell having its adjacent longitudinal edges over-lapped, means disposed within the shell for expanding and contracting the walls thereof, formers disposed on opposite sides of the shell and spaced from the latter to form intermediate molding compartments, adjustable spacing plates carried by the formers and bearing against the exterior walls of the expansible shell, a shaft journaled on the shell, and a flexible connection between the shaft and the longitudinal plates for raising and lowering the latter.

10. A mold including a shell, longitudinal plates curved to conform to and spaced from the exterior walls of the shell to form an intermediate molding compartment, transverse plates carried by the longitudinal plates and bearing against the adjacent walls of the shell, the lower longitudinal edge of each plate being extended below the adjacent edge of the transverse plates, and means for raising and lowering the longitudinal plates.

11. A mold including an expansible shell, a turn buckle disposed within and connecting the walls of the shell for expanding and contracting the latter, brackets detachably secured to the exterior walls of the shell and provided with terminal eyes, an operating shaft journaled in said eyes, segmental plates disposed on each side of the shell and spaced from the latter to form intermediate compartments, over-lapping plates carried by the segmental plates, one of said plates being provided with a slot and the other with a pin extending through said slot for varying the width of the molding compartment, and a flexible connection between the segmental plates and shaft for raising and lowering said plates.

In testimony that I claim the foregoing as my own, I have hereto affixed my signature in the presence of two witnesses.

JOSEPH HICKSON.

Witnesses:
JOHN J. HICKSON,
BUDD BAKES.